United States Patent [19]

Matsuzawa et al.

[11] 3,803,003

[45] Apr. 9, 1974

[54] PROCESS FOR PREPARING PURIFIED BIS (BETA-HYDROXYETHYL) TEREPHTHALATE

[75] Inventors: Katsuto Matsuzawa; Yoshikazu Murao; Kenichi Oya, all of Tokyo, Japan

[73] Assignee: Mitsubishi Chemical Industries, Ltd., Tokyo, Japan

[22] Filed: July 14, 1971

[21] Appl. No.: 162,624

[30] Foreign Application Priority Data
July 23, 1970    Japan.................................. 45-64471

[52] U.S. Cl........................ 203/8, 203/89, 203/90, 203/91, 260/475 PR
[51] Int. Cl......................... B01d 3/10, C07c 69/76
[58] Field of Search............... 203/8, 91, 89, 90, 88, 203/2; 260/475 PR

[56] References Cited
UNITED STATES PATENTS 3,668,235    6/1972    Ichikawa et al............... 260/475 PR
3,201,331    8/1965    Hunter................................. 203/89
2,994,645    8/1961    Jones et al........................... 203/91
3,060,107    10/1962   Smith.................................. 203/89
3,461,153    8/1969    Tholstrup et al. ............ 260/475 PR
3,183,553    9/1965    Slater................................ 159/2 E
3,565,768    2/1971    Grant.................................. 203/89
3,037,060    5/1962    Dege.................................... 203/89
2,791,551    5/1957    Ash et al............................. 203/89

*Primary Examiner*—Wilbur L. Bascomb, Jr.
*Attorney, Agent, or Firm*—Oblon, Fisher, Spivak, McClelland & Maier

[57] ABSTRACT

A purified bis-($\beta$-hydroxyethyl) terephthalate is prepared by rapid distillation of crude bis-($\beta$-hydroxyethyl) terephthalate at 200°–350°C., in vacuum, preferably in the presence of a polymerization inhibitor. Suitable rapid distillation techniques include thin film evaporation.

11 Claims, No Drawings

PROCESS FOR PREPARING PURIFIED BIS (BETA-HYDROXYETHYL) TEREPHTHALATE

BACKGROUND OF THE INVENTION

1. Field Of Invention:

This invention relates to a process for preparing high purity bis-($\beta$-hydroxyethyl)terephthalate (hereinafter referred to as BHET).

2. Description Of Prior Art:

It has been known that BHET can be used for preparing polyethylene terephthalate, but for this utility it is necessary that comparatively high purity BHET be used. Two processes have been considered for preparing such high purity BHET:

1. A purified BHET can be obtained by reacting a purified terephthalic acid with ethylene oxide to yield BHET. Reaction impurities, such as catalyst by-products, e.g., diethyleneglycol, etc., are then separated.

2. Purified BHET is obtained by reacting crude terephthalic acid with ethylene oxide to yield BHET. Both reaction impurities and impurities from the crude terephthalic acid are then separated.

The properties of the impurities introduced through the crude terephthalic acid are generally different from those caused by the reaction of terephthalic acid and ethylene oxide. Accordingly, in process (2), a two-step purification procedure is usually used; one step for each type of impurity. The presence of reaction impurities due to the reaction of terephthalic acid and ethylene oxide cannot be avoided in either of processes (1) or (2), and hence they must be removed in both of those processes. Accordingly, it is quite important to provide an effective method for removing these impurities in an industrially acceptable manner. Various techniques have been proposed for this purification, such as recrystallization of BHET from water or an organic solvent, treatment with an adsorbent, e.g., activated carbon, and chemical treatment by an agent capable of reacting with and removing the impurities. However, these conventional processes do not effectively remove the impurities, and yet they are rather complex and relatively costly so that they are not sufficiently economical for industrial scale use.

It has been contemplated to remove the impurities from BHET by distillating. However, as stated in Japanese Patent Publication No. 21292/1968, it has heretofore been believed to be impossible to distill BHET because BHET is readily polymerized at high temperatures. By conventional fractional distillation of BHET, a large quantity of BHET oligomer was produced as a by-product which thereby significantly decreases the yield of the pure BHET distilled. In fact, it has been found that as much as 40 – 50 percent or more of the total BHET supplied was converted into the polymer residue during distillation, which polymer was found to have a polymerization degree of 10 and a melting point of about 250°C. Thus, it is necessary to recycle and effect decomposition of a large amount of the residue in order to improve the yield. However, during this additional treatment, it is necessary to use a large quantity of ethylene glycol in order to effect the decomposition reaction. Heretofore, therefore, it has not been practical or commercially feasible to distill BHET.

SUMMARY OF THE INVENTION

Accordingly, it is an object of this invention to provide a process for preparing high purity of bis-($\beta$-hydroxyethyl)terephthalate which can be used for the preparation of polyethyleneterephthalate without causing undesirable color change in the product.

It is another object of this invention to provide an economical industrial process for preparing high purity BHET, wherein the formation of BHET oligomer by-products are minimized.

These and other objects have now herein been attained by rapid distillation of crude BHET at 200° – 350°C., in vacuum, to yield a distillate of pure BHET.

DETAILED DESCRIPTION OF EMBODIMENTS OF THE INVENTION

The rapid distillation of crude BHET can be accomplished by distilling BHET in a maximum time period of 1 minute, and preferably less than several tens of seconds of residence time, in a high temperature zone. Rapid distillation apparatus used for carrying out this process on an industrial scale include the conventional thin film evaporators. Other types of rapid distillation apparatus, capable of distilling BHET within a residence time of preferably several to several tens of seconds in a high temperature zone, may also be used.

One good method for accomplishing such rapid distillation is attained by supplying BHET, dropwise, to a rotating element which centrifugally forces small size particles of BHET to a hot wall heated by a jacket at 200° – 350°C. This results in the formation of a thin film of BHET which is rapidly evaporated from the wall.

In order to provide a low degree of polymerization and a low decomposition reaction velocity, it is preferable to use relatively low temperatures. On the other hand, in order to provide a sufficient speedy distillation velocity and yet maintain stable operation, it is preferable to use relatively high temperatures. Accordingly, in order to attain the objects of this invention wherein loss caused by polymerization of BHET is minimized, and to provide a stable purification operation, it is preferable to carry out the distillation within the range of 200° – 350°C., and preferably 250° – 300°C. These temperatures can be obtained, for instance, on a wall of a rapid distillation apparatus which may be heated by a heat jacket.

During rapid distillation of BHET, it is preferable to add a suitable amount of polymerization inhibitor to the crude BHET, to decrease the formation of BHET oligomer. Suitable polymerization inhibitors used in this process are preferably those compounds which form stable salts, chelated compounds, or metal complexes with those metals which might be present during distillation. It is believed that these impurity metals effect the polymerization of BHET as a catalyst and based on this theory, if these impurity metals can be inactivated, the extent of polymerization can be reduced. The inhibitors used for this purpose additionally must be stable at 200° – 350°C. and must not impart an undesirable coloration to the final product.

Suitable polymerization inhibitors used in this invention include the phosphorous compounds and boron compounds, such as phosphoric acid, phosphorous acid, hypophosphorous acid, pyrophosphoric acid, polyphosphoric acid, boric acid, metaboric acid, pyroboric acid, and alkali metal salts, alkali earth metal salts, ammonium salts, and acidic salts of said acids;

alkyl esters, such as substituted alkyl esters, aryl esters and substituted aryl esters or semiesters of said acids; salts of said esters; and sulfur compounds, such as benzene sulfonic acid, substituted benzene sulfonic acids and salts of sulfonic acids and esters of sulfonic acids.

The specific polymerization inhibitors and the quantity depend, of course, on the conditions of the rapid distillation. The amount of polymerization inhibitor should be sufficient to decrease the formation of BHET oligomer. If the polymerization inhibitor is selected such that it will not distill with the BHET, it is possible to add a relatively high percentage of the inhibitor. However, in general, the quantity of inhibitor can be quite small, and yet permit good results. For example, 1 weight percent of triphenyl phosphite to BHET is sufficient to decrease the formation of BHET oligomer.

During rapid distillation, it is preferable to control the pressure in the distillation apparatus by supplying $N_2$ gas. The distilled BHET will thus be carried with the $N_2$ gas. It is preferable to maintain the distillation apparatus in vacuum, of a pressure of 3 mmHg, by sucking the apparatus with a vacuum pump and by supplying $N_2$ gas for pressure control. The pressure of a rapid distillation apparatus may be maintained at 1 mmHg - 30 mmHg and preferably about 5 mmHg for good results.

It is also possible to remove low boiling point distillates by employing multi-stage distillation apparatus, in accordance with the process of this invention, and it is possible to combine other purification procedures either before or after the distillation of this invention, to obtain higher purification effects. For instance, any conventional purification process may be used such as removal of BHET oligomer by recrystallization from water or other suitable solvent before the distillation. This expedient results in a significant increase in yield of BHET distillate.

In general, there are two methods for preparing highly purified BHET by the process of this invention:

1. A purified BHET is obtained by reacting purified terephthalic acid with ethylene oxide in the presence of a basic catalyst, and then rapidly distilling the resulting BHET, preferably in the presence of a polymerization inhibitor.

2. A purified BHET is obtained by reacting crude terephthalic acid and ethylene oxide in the presence of a basic catalyst, and, if necessary, removing impurities caused by said crude terephthalic acid, especially 4-carboxybenzaldehyde derivatives. The resulting BHET is then rapidly distilled, preferably in the presence of a polymerization inhibitor. The purified terephthalic acid used in process (1) can be high purity terephthalic acid prepared by conventional techniques. However, it is economical to use purified terephthalic acid which is prepared by heating an aqueous solution of crude terephthalic acid containing 4-carboxybenzaldehyde, formed by liquid phase oxidation of para-xylene, in the presence of a precious metal of Group VIII of the Periodic Table, such as palladium, with or without hydrogen, and then separating the resultng terephthalic acid by cooling.

In the reaction between the purified terephthalic acid and ethylene oxide, conventional reaction conditions can be applied. An organic solvent, such as an aromatic hydrocarbon, may effectively be employed as a solvent in the reaction.

If it is desired to remove the impurities caused by crude terephthalic acid, especially 4-carboxybenzaldehyde, prior to the rapid distillation technique of process (2), the BHET containing the impurities is prepared in the form of a melt, an organic solvent solution or an aqueous solution. The BHET in this form is treated with hydrogen in the presence of a precious metal of Group VIII of the Periodic Table.

The preferred embodiments of process (2) are as follows:

1. crude terephthalic acid — esterification in the absence of solvent — hydrogenation in the absence of solvent (melt) — distillation.
2. crude terephthalic acid — esterification in organic solvent — hydrogenation in the organic solvent — distillation.
3. crude terephthalic acid — esterification in the organic solvent — hydrogenation in the absence of solvent — distillation.
4. crude terephthalic acid — esterification in the organic solvent — hydrogenation in aqueous solvent — distillation.

During the esterification, if no solvent is used, relatively large amounts of ethylene oxide are used in the reaction system. It is desirable to use an organic solvent for esterification, therefore, and particularly good results are obtainable with aromatic hydrocarbons.

When using the rapid distillation process of this invention, it is possible to obtain high purity BHET in a yield of 90 percent or better, since the formation of BHET oligomer is decreased. It is also possible to effectively remove the impurities caused by the terephthalic acid-ethylene oxide reaction simply and economically. Moreover, it is possible to effectively remove the impurities introduced from the crude terephthalic acid. Accordingly, it is possible to partially omit the previously required purification step of terephthalic acid, when crude terephthalic acid is used as the starting material.

Having generally described the invention, a further understanding can be obtained by reference to certain examples which are provided herein for purposes of illustration only and are not intended to be limiting in any manner unless otherwise specified.

EXAMPLE 1

Crude terephthalic acid, obtained by liquid phase air oxidation of para-xylene, was reacted with ethylene oxide in the presence of triethylamine, as a catalyst, in a xylene medium, to yield a mixture containing BHET. The resulting product was recrystallized with water to remove unreacted terephthalic acid and any oligomer of BHET. The resulting crude BHET contains 8 ppm of ash. 200 g. of the crude BHET was melted in a dropping funnel, equipped with a jacket for maintaining the temperature at 160°C., which was connected to one of three necks of a three-neck flask having a volume of 200 ml.

One of the other necks was used as an $N_2$ gas inlet and the last neck was used as a distillation outlet to which an air cooling receptor was connected. The receptor was further connected to a vacuum pump.

The three-necked flask was maintained at 270°C. on a mantle heater and the vacuum pump was operated to maintain a pressure of 3 mmHg in the flask. The valve of the dropping funnel was then opened to dropwise feed BHET at the rate of 1 cc/minute into the flask. A rotator was provided in the flask so that each drop of BHET is centrifugally forced to the internal surface of the flask at which the BHET was rapidly evaporated.

By supplying $N_2$ gas to the flask, the pressure of the flask was controlled and the thin film formation for BHET was promoted. The average residence time for BHET in the distillation flask was about 10 seconds. After continuous distillation for 3 hours + 25 minutes, 182.4 g. of BHET was obtained, and 15.4 g. of residue was found in the distillation flask. (yield of BHET was 91.2 percent by weight based on the total weight of BHET.) The ash in the resulting BHET was 2 ppm., and the white color of polyethylene terephthalate was obtained by polycondensation of the resulting BHET.

EXAMPLES 2 – 7

The rapid distillation of BHET of Example 1 was repeated, except that the following additives were added to the crude BHET. The resulting high purity of BHET was obtained in high yields as shown in the Table.

| Example | Total BHET (g) | Additive | Distilled Amount (g) | BHET (g) | Residue (g) | Yield * (%) |
|---|---|---|---|---|---|---|
| 1 | 200 | none | — | 182.4 | 15.4 | 91.2 |
| 2 | do. | $H_3PO_4$ | 1 | 184.2 | 14.0 | 92.1 |
| 3 | do. | $(C_6H_5O)_3P=O$ | 1 | 187.7 | 9.4 | 93.8 |
| 4 | do. | $(C_6H_5O)_3P$ | 2 | 192.9 | 4.0 | 96.5 |
| 5 | do. | do. | 1 | 193.1 | 3.0 | 96.6 |
| 6 | do. | do. | 0.2 | 187.0 | 5.4 | 93.5 |
| 7 | do. | $H_3BO_3$ | 1 | 184.0 | 13.8 | 92.0 |

* "Yield" is distillation rate of BHET by weight based on the total weight of BHET supplied.

EXAMPLE 8

Terephthalic acid was prepared by oxidation of para-xylene with air in liquid phase, and was reacted with ethylene oxide in the presence of a catalyst, tetraethylammonium chloride, in toluene, to yield a reaction mixture containing BHET. Recrystallization from an aqueous solution caused the removal of unreacted terephthalic acid and BHET oligomer. The resulting BHET was heated to 150°C. to form a melt and was fed to a Luwa type thin film evaporator having a jacket whose inner diameter is 82 mm. A coaxially adjacent rotor, whose outer diameter is 80 mm. and whose rotary speed was 1500

Terephthalic acid was prepared by oxidation of para-xylene with air in liquid phase, and was reacted with ethylene oxide in the presence of a catalyst, tetraethylammonium chloride, in toluene, to yield a reaction mixture containing BHET. Recrystallization from an aqueous solution caused the removal of unreacted terephthalic acid and BHET oligomer. The resulting BHET was heated to 150°C. to form a melt and was fed to a Luwa type thin film evaporator having a jacket whose inner diameter is 82 mm. A coaxially adjacent rotor, whose outer diameter is 80 mm. and whose rotary speed was 1500 rpm., was provided. The BHET was fed into the system at a rate of 8.1 kg/hour, and the average residence time for the BHET in the system was 8 seconds. Purified BHET was obtained from the top of the tower at the rate of 7.4 kg/hour, and the residual liquid was obtained from the bottom of the tower at the rate of 0.56 kg/hour. The analysis of the residual liquid showed that it contained 24 weight percent undistilled BHET. The yiehd of purified rpm., was provided. The BHET was fed into the system at a rate of 8.1 kg/hour, and the average residence time for the BHET in the system was 8 seconds. Purified BHET was obtained from the top of the tower at the rate of 7.4 kg/hour, and the residual liquid was obtained from the bottom of the tower at the rate of 0.56 kg/hour. The analysis of the residual liquid showed that it contained 24 weight percent undistilled BHET. The yield of purified BHET was 91.4 weight percent based on the total amount of BHET supplied to the apparatus. Total recovery rate of BHET including BHET in the residual liquid was 93.0 weight percent.

Having now fully described the invention, it will be apparent to one of ordinary skill in the art that many changes and modifications can be made thereto without departing from the spirit or scope of the invention. ACCORDINGLY,

What is claimed as new and intended to be covered by Letters Patent of the United States is:

1. A process for purifying crude bis-($\beta$-hydroxyethyl) terephthalate containing at least impurities having a boiling point higher than said bis-($\beta$-hydroxyethyl)-terephthalate, which comprises rapidly distilling crude bis-($\beta$-hydroxyethyl)terephthalate containing at least higher boiling impurities in a high temperature zone at a temperature of 200°–350°C in a vacuum, maintaining the bis-($\beta$-hydroxyethyl)terephthalate in the high temperature zone for a residence time of less than 1 minute and recovering purified bis-($\beta$-hydroxyethyl)terephthalate as the distillate.

2. The process of claim 1, wherein said bis-($\beta$-hydroxyethyl)terephthalate is melted and centrifugally forced into the high temperature zone by a rotating element.

3. The process of claim 1, wherein a thin film evaporator having a rotating element and wall heated to a temperature of 200°–350°C. is used for said rapid distillation of crude bis-($\beta$-hydroxyethyl)terephthalate.

4. The process of claim 1, wherein said bis-($\beta$-hydroxyethyl)terephthalate is melted and is sprayed onto a high temperature element heated to 200°–350°C.

5. The process of claim 1, wherein said rapid distillation is carried out in the presence of the polymerization inhibitor for preventing formation of oligomer of bis-($\beta$-hydroxyethyl)terephthalate.

6. The process of claim 5, wherein said polymerization inhibitor is a phosphorous compound which prevents the formation of a bis-(β-hydroxyethyl)terephthalate oligomer.

7. The process of claim 1, wherein the pressure in the distillation system is controlled by the introduction of nitrogen gas thereto.

8. The process of claim 1 wherein the bis-(β-hydroxyethyl)terephthalate is prepared from crude terephthalic acid by reaction with ethylene oxide in the presence of a basic catalyst, and the resulting crude product is treated with hydrogen in the presence of a hydrogenation catalyst.

9. The process of claim 7, wherein said crude terephthalic acid is reacted with ethylene oxide in the absence of a solvent.

10. The process of claim 1 wherein the crude bis-(β-hydroxyethyl)terephthalate is in the form of an aqueous solution formed by the reaction of terephthalic acid with ethylene oxide in the presence of a metal catalyst of a Group VIII metal at a temperature of from 200°–400°C.

11. The process of claim 1, wherein said crude bis(β-hydroxyethyl)terephthalate is prepared by the reaction of ethylene oxide and high purity terephthalic acid.

* * * * *